US011880147B1

(12) United States Patent
Wakai

(10) Patent No.: US 11,880,147 B1
(45) Date of Patent: Jan. 23, 2024

(54) DEVELOPING DEVICE AND IMAGE FORMING APPARATUS

(71) Applicant: FUJIFILM Business Innovation Corp., Tokyo (JP)

(72) Inventor: Takafumi Wakai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/960,156

(22) Filed: Oct. 5, 2022

(30) Foreign Application Priority Data

Mar. 25, 2022 (JP) ................................ 2022-050480

(51) Int. Cl.
*G03G 15/08* (2006.01)

(52) U.S. Cl.
CPC ..... *G03G 15/0898* (2013.01); *G03G 15/0865* (2013.01); *G03G 15/0887* (2013.01)

(58) Field of Classification Search
CPC ........... G03G 15/0865; G03G 15/0882; G03G 15/0887; G03G 15/0898
See application file for complete search history.

(56) References Cited

U.S. PATENT DOCUMENTS

| | | | | |
|---|---|---|---|---|
| 10,663,881 B1 * | 5/2020 | Wakai | ................ | G03G 15/0898 |
| 2009/0116867 A1 * | 5/2009 | Kuba | ................ | G03G 15/0882 399/105 |
| 2017/0115606 A1 * | 4/2017 | Sakamaki | .......... | G03G 15/0865 |
| 2018/0299810 A1 * | 10/2018 | Miura | ................ | G03G 15/0865 |
| 2018/0348698 A1 * | 12/2018 | Tamaki | .............. | G03G 15/0898 |
| 2022/0035271 A1 * | 2/2022 | Wakisaka | ........... | G03G 15/0882 |

FOREIGN PATENT DOCUMENTS

| | | |
|---|---|---|
| JP | H0973230 | 3/1997 |
| JP | 2009115973 | 5/2009 |
| JP | 2017076104 | 4/2017 |

* cited by examiner

*Primary Examiner* — Sophia S Chen
(74) *Attorney, Agent, or Firm* — JCIPRNET

(57) ABSTRACT

A developing device includes: a housing which includes an opening portion open downward and in which a developer is stored in an internal storage space, the storage space being formed of a region of the internal space in which the developer is present; a sealing part that seals the opening portion and is removed to allow the developer to fall through the opening portion; a storage part that stores the developer having fallen through the opening portion; an inlet that is provided in the housing, allows the developer floating from the storage part to flow into the storage space from which the developer has fallen, and is different from the opening portion; and a collecting part that is provided on the housing and collects the developer having flowed into the storage space through the inlet.

20 Claims, 6 Drawing Sheets

DEVELOPING DEVICE AND IMAGE FORMING APPARATUS

CROSS-REFERENCE TO RELATED APPLICATIONS

This application is based on and claims priority under 35 USC 119 from Japanese Patent Application No. 2022-050480 filed Mar. 25, 2022.

BACKGROUND

(i) Technical Field

The present invention relates to a developing device and an image forming apparatus.

(ii) Related Art

JP2017-76104A discloses a developing device in which a developer is stored and which develops a latent image formed on the surface of an image carrier. The developing device includes a plurality of transport passages that form a circulation passage for the developer, and each of the transport passages is provided with a developer carrier that faces or is in contact with the image carrier and carries a developer and a transport member that transports the developer stored in the developing device in a longitudinal direction. Each of the plurality of transport passages is provided with a communicating portion that communicates with the transport passages adjacent to each other with a wall portion interposed therebetween. In a state where a developer is stored in only one transport passage of the plurality of transport passages, a sheet-like member that seals the communicating portion of the one transport passage to make the one transport passage as a sealed space is attachably and detachably installed.

JP2009-115973A discloses a developing device that includes at least a developer carrier for carrying a developer used to develop a latent image formed on an image carrier and an unused developer storage part filled with an unused developer. The unused developer storage part includes an opening portion used to discharge the unused developer to a position that can be in contact with the developer carrier, and the opening portion is provided with a movable sealing member that seals the unused developer. In a case where the developing device starts to be used, the sealing member is moved to a predetermined position to open the opening portion and to release the sealing of the unused developer, the sealing member is adapted to stay in the developing device, and a portion of the sealing member, with which the unused developer has been in contact, is adapted not to be exposed to the outside of the device.

JP1997-73230A discloses a developing device that includes a developing housing (2) in which a developing opening (3) is provided at a portion facing a latent image carrier (1), includes a developer carrier (4) disposed to face the developing opening (3), carries a developer by the developer carrier (4) and transports the developer up to a developing region facing the latent image carrier (1), and develops an electrostatic latent image formed on the latent image carrier (1) with the developer. A developer return passage (9), which communicates with an upper space (8) of the developing region and a developer storage chamber (6) in which a developer is stored, is defined and formed along an upper wall portion of the developing housing (2), a rotary recovery member (11) driven by an identical drive source (10) as the developer carrier (4) is disposed in the developer return passage (9), and an exhaust resistant member (12), which communicates with the outside and in which a resistant portion for preventing the outflow of a developer is formed, is provided at a part of the developing housing (2) facing a space positioned on a side of the developer storage chamber (6) of the rotary recovery member (11).

SUMMARY

A developing device including a housing which includes an opening portion open downward and in which a developer is stored in an internal storage space, a sealing part that seals the opening portion and is removed to allow the developer to fall through the opening portion, and a storage part that stores the developer having fallen through the opening portion is conceivable as a developing device.

In a case where a developer floating from the storage part is caused to flow into only a space separate from the storage space formed inside the housing and is collected in the developing device, a large space required to provide the separate space is required in the housing.

Aspects of non-limiting embodiments of the present disclosure relate to a developing device and an image forming apparatus that save a space as compared to a case where a developer floating from a storage part is caused to flow into only a space separate from a storage space formed inside a housing and is collected.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a developing device including: a housing which includes an opening portion open downward and in which a developer is stored in an internal storage space, the storage space being formed of a region of the internal space in which the developer is present; a sealing part that seals the opening portion and is removed to allow the developer to fall through the opening portion; a storage part that stores the developer having fallen through the opening portion; an inlet that is provided in the housing, allows the developer floating from the storage part to flow into the storage space from which the developer has fallen, and is different from the opening portion; and a collecting part that is provided on the housing and collects the developer having flowed into the storage space through the inlet.

BRIEF DESCRIPTION OF THE DRAWINGS

Exemplary embodiment(s) of the present invention will be described in detail based on the following figures, wherein.

DETAILED DESCRIPTION

Examples of exemplary embodiments of the present invention will be described below with reference to the drawings.

Image Forming Apparatus 10

Figure 1:
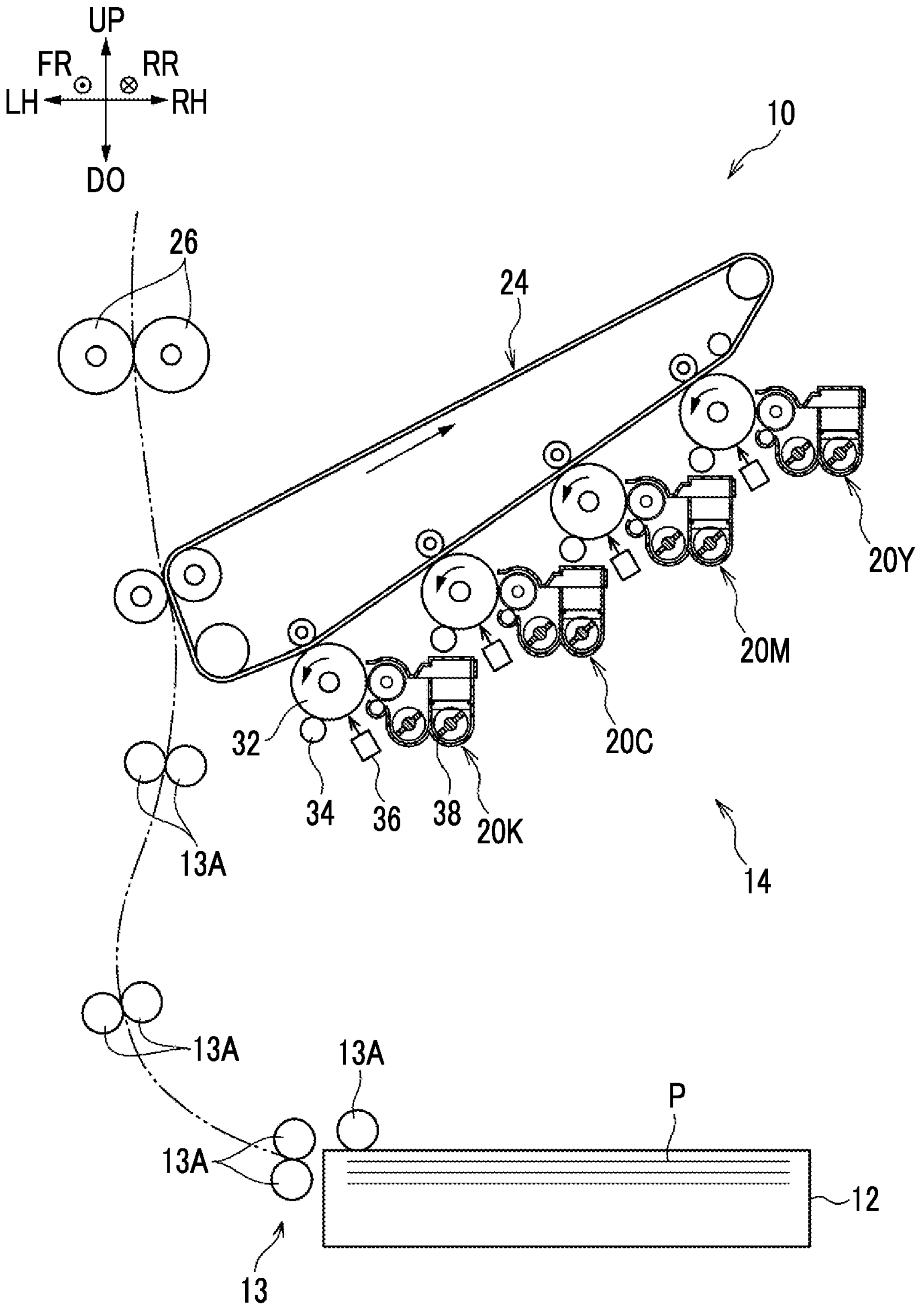
FIG. 1 is a schematic diagram showing an image forming apparatus according to a present exemplary embodiment.

The configuration of an image forming apparatus 10 according to the present exemplary embodiment will be described. FIG. 1 is a schematic diagram showing the configuration of the image forming apparatus 10 according to the present exemplary embodiment.

An arrow UP shown in the drawings indicates the upper side of the apparatus (specifically, a vertical upper side) and an arrow DO indicates the lower side of the apparatus (specifically, a vertical lower side). Further, an arrow LH shown in the drawings indicates the left side of the apparatus and an arrow RH indicates the right side of the apparatus. Furthermore, an arrow FR shown in the drawings indicates the front side of the apparatus and an arrow RR indicates the rear side of the apparatus. Since these directions are directions defined for the convenience of description, the configuration of the apparatus is not limited to these directions. The word "apparatus" may be omitted in each direction of the apparatus. That is, for example, "the upper side of the apparatus" may be simply referred to as "the upper side".

Further, in the following description, "up-down direction" may be used to mean "both an upper side and a lower side" or "any one of the upper side or the lower side". "Left-right direction" may be used to mean "both a left side and a right side" or "any one of the left side or the right side". "Left-right direction" may be also referred to as a lateral side, a lateral direction, and a horizontal direction. "Front-rear direction" may be used to mean "both a front side and a rear side" or "anyone of the front side or the rear side". "Front-rear direction" may be also referred to as a lateral side, a lateral direction, and a horizontal direction. Furthermore, the up-down direction, the left-right direction, and the front-rear direction are directions intersecting with each other (specifically, directions orthogonal to each other).

Further, a symbol in which "x" is written in "○" in the drawings means an arrow from the front to the back of the plane of the paper. Furthermore, a symbol in which "•" is written in "○" in the drawings means an arrow from the back to the front of the plane of the paper.

The image forming apparatus 10 shown in FIG. 1 is an apparatus for forming an image. Specifically, as shown in FIG. 1, the image forming apparatus 10 includes a medium storage part 12, a transport unit 13, and an image forming unit 14. Each part of the image forming apparatus 10 will be described below.

Medium Storage Part 12 and Transport Unit 13

The medium storage part 12 is a part that stores recording mediums P in the image forming apparatus 10. The recording mediums P stored in the medium storage part 12 are supplied to the image forming unit 14. The recording medium P stored in the medium storage part 12 is an object on which images are to be formed by the image forming unit 14. Examples of the recording medium P include a sheet, a film, and the like. Examples of the film include a resin film, a metal film, and the like. The recording medium P is not limited to the above-mentioned mediums and various recording mediums can be used.

The transport unit 13 shown in FIG. 1 transports the recording mediums P stored in the medium storage part 12 to a discharge unit (not shown). Specifically, as shown in FIG. 1, the transport unit 13 includes transport members 13A, such as a plurality of transport rollers, and transports the recording mediums P by the transport members 13A. Examples of the transport members 13A include transport members, such as a transport belt and a transport drum, and various transport members can be used.

Image Forming Unit 14

The image forming unit 14 shown in FIG. 1 forms images on the recording medium P that is transported by the transport unit 13 (specifically, the transport members 13A). Specifically, the image forming unit 14 forms toner images (an example of images) on the recording medium P by an electrophotographic method. More specifically, as shown in FIG. 1, the image forming unit 14 includes toner image forming units 20Y, 20M, 20C, and 20K (hereinafter, referred to as 20Y to 20K), a transfer body 24, and a fixing unit 26.

Each of the toner image forming units 20Y to 20K includes a photoreceptor 32. Since the toner image forming units 20Y to 20K have an identical configuration, the reference numerals of the respective parts of the toner image forming units 20Y, 20M, and 20C are omitted in FIG. 1.

The photoreceptor 32 is an example of a holding body, and is a structure that holds a latent image. Specifically, the photoreceptor 32 is rotated in one direction (for example, a counterclockwise direction in FIG. 1). A charging device 34, an exposure device 36, and a developing device 38 are provided around the photoreceptor 32 in order from an upstream side in the rotation direction of the photoreceptor 32.

In each of the toner image forming units 20Y to 20K, the charging device 34 charges the photoreceptor 32 (charging step). In addition, the exposure device 36 exposes the photoreceptor 32, which is charged by the charging device 34, to form a latent image (specifically, an electrostatic latent image) on the photoreceptor 32 (exposure step). The photoreceptor 32 holds the latent image formed by the exposure device 36.

Then, the developing device 38 develops the latent image that is held by the photoreceptor 32 (developing step). Accordingly, a toner image is formed on the photoreceptor 32. The specific configuration of the developing device 38 will be described later.

In the image forming unit 14, the respective toner image forming units 20Y to 20K perform the respective steps, such as charging, exposure, and development, to form toner images having the respective colors, such as yellow (Y), magenta (M), cyan (C), and black (K), on the transfer body 24. In addition, the image forming unit 14 transfers the toner images having the respective colors, which are formed on the transfer body 24, to the recording medium P and fixes the toner images to the recording medium P by the fixing unit 26. The image forming unit 14 uses an intermediate transfer method of transferring an image to the recording medium P via the transfer body 24 in this way.

The image forming unit may use a direct transfer method of directly transferring an image to a recording medium P without being limited to an intermediate transfer method, and various image forming units can be applied.

Developing Device 38

Figure 2:
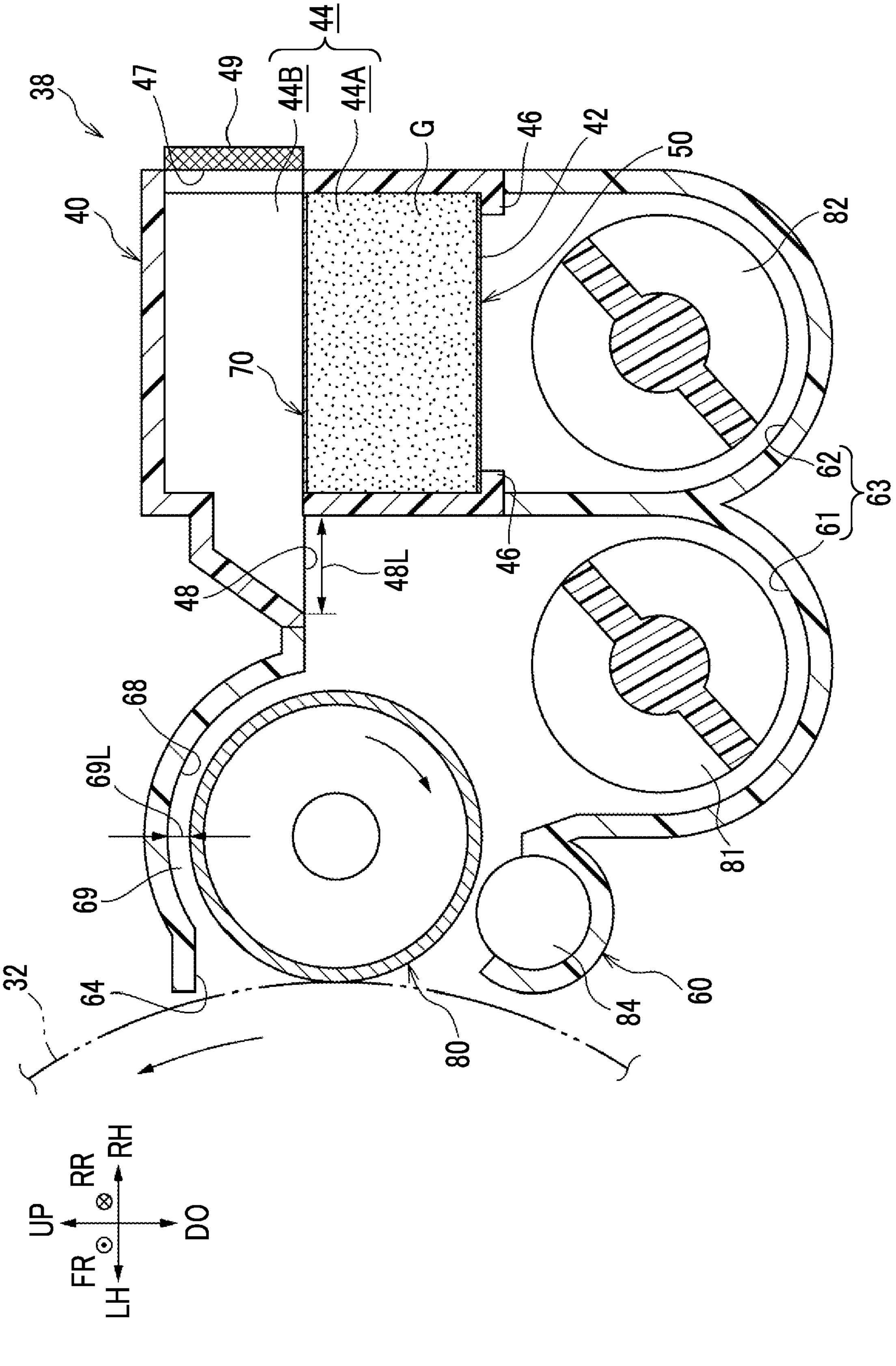
FIG. 2 is a schematic diagram showing a developing device according to the present exemplary embodiment.
Figure 3:
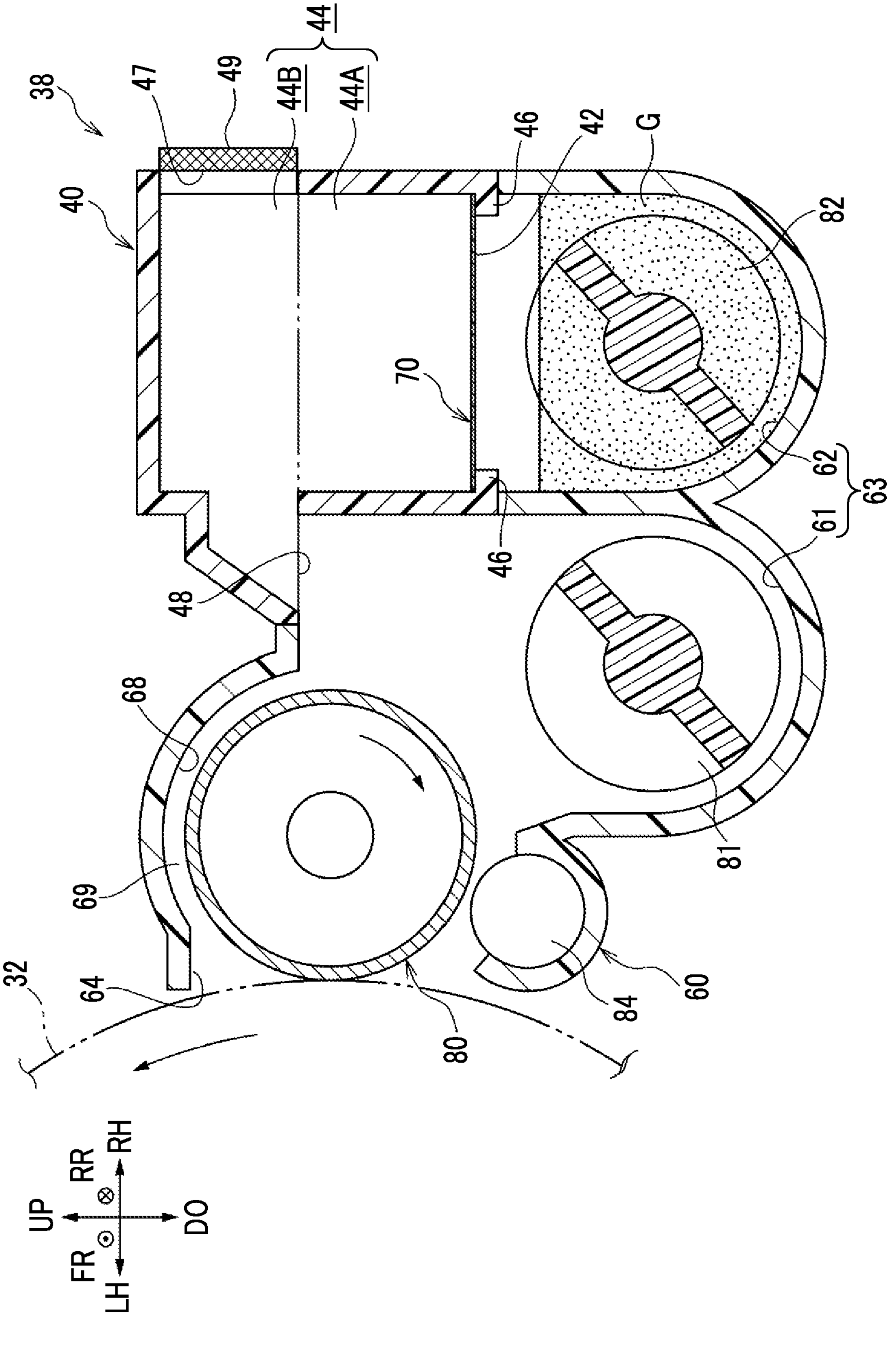
FIG. 3 is a schematic diagram showing a state where a developer stored in a storage space is supplied to a storage part in the developing device shown in FIG. 2.
Figure 4:
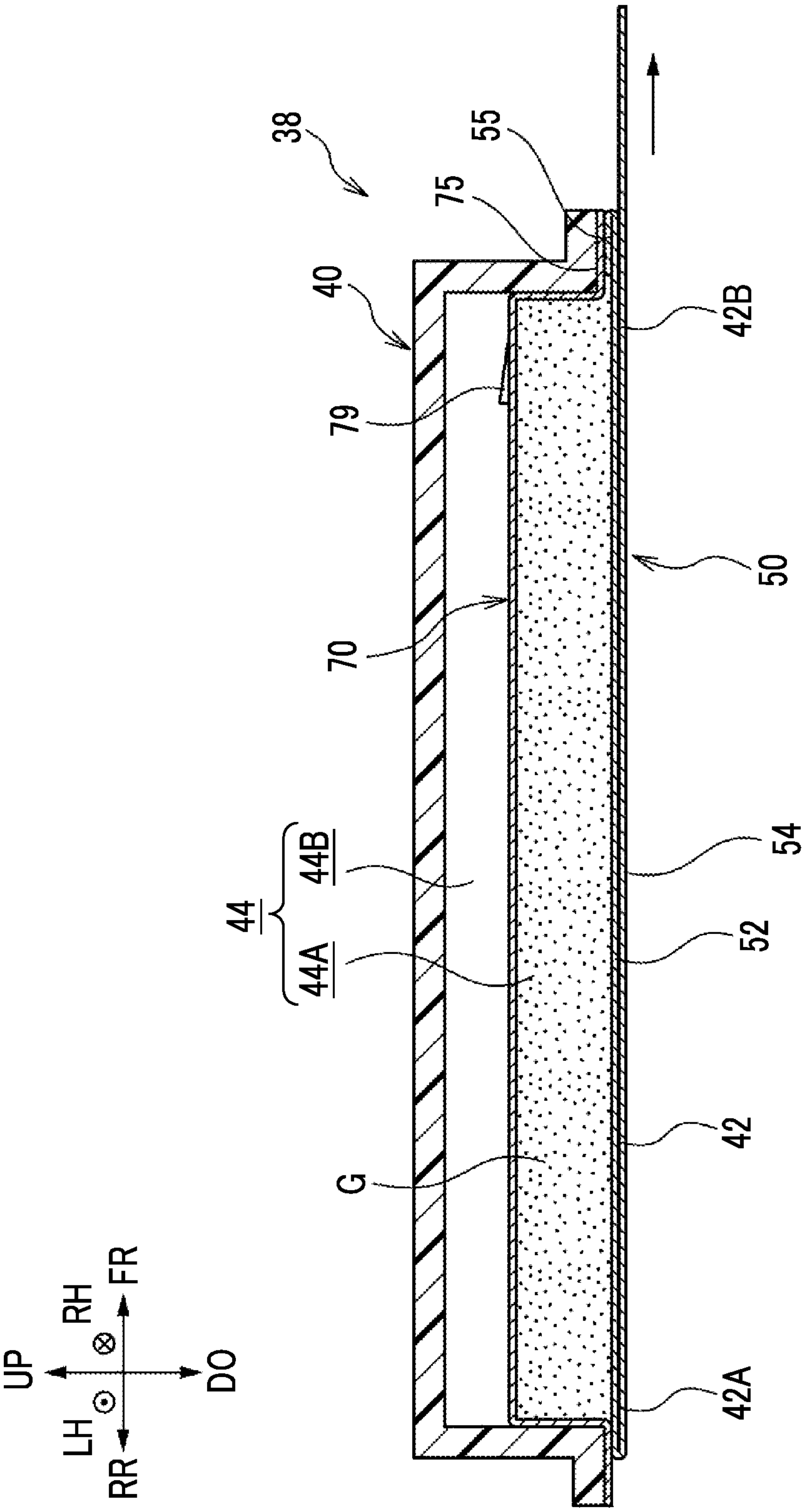
FIG. 4 is a side sectional view of a storage housing of the developing device according to the present exemplary embodiment.
Figure 5:
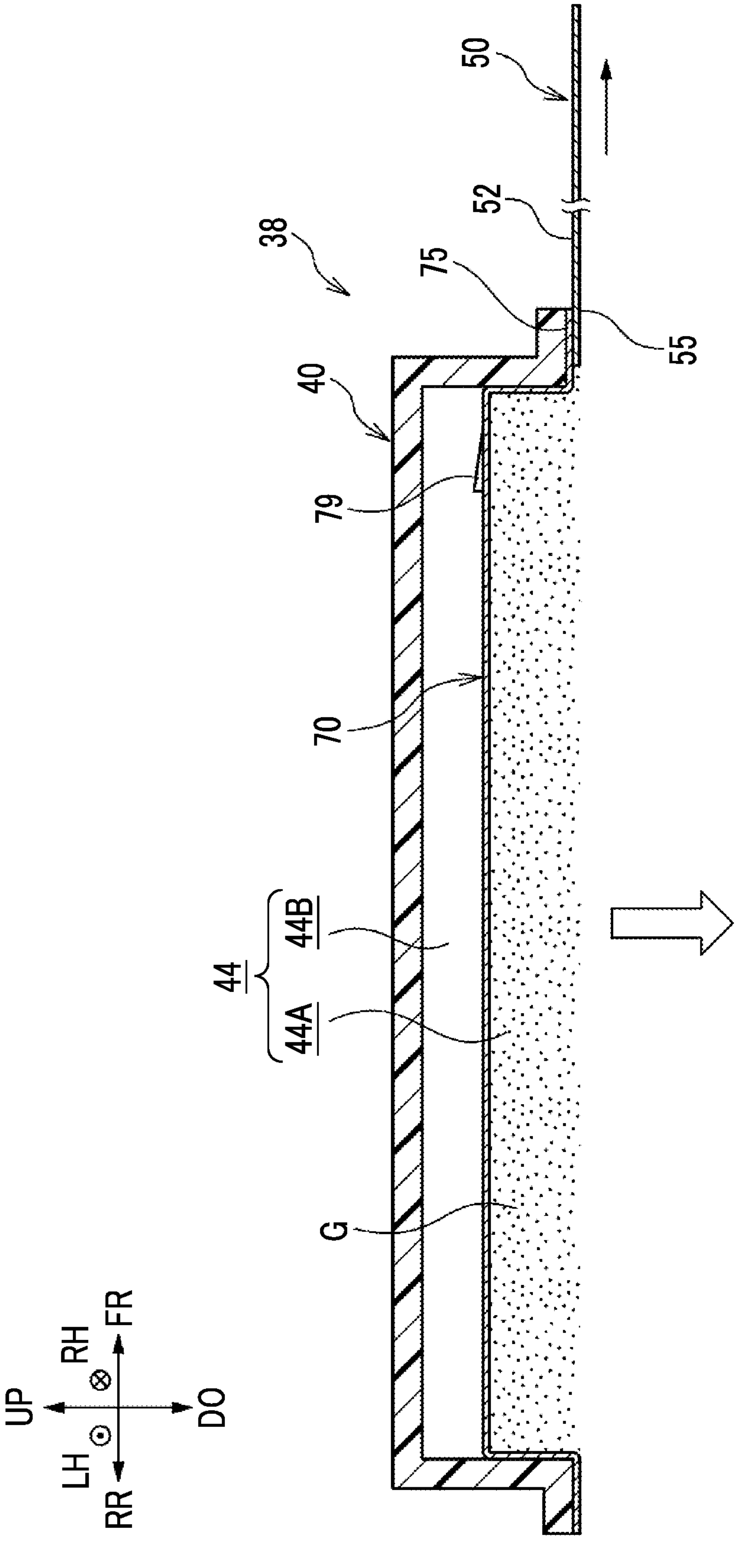
FIG. 5 is a side sectional view showing a state where a sealing member is pulled forward in the storage housing shown in FIG. 4.
Figure 6:
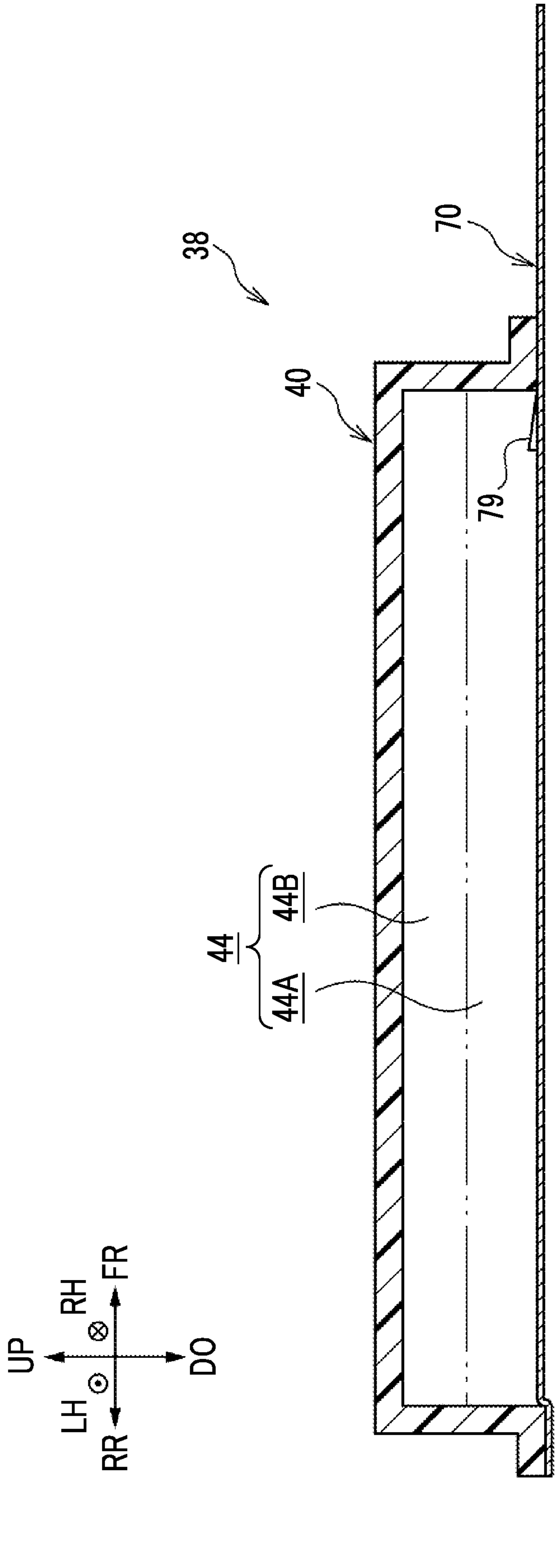
FIG. 6 is a side sectional view showing a state where the sealing member is further pulled forward in the storage housing shown in FIG. 5.

FIGS. 2 and 3 are schematic diagrams showing the developing device 38. FIGS. 4, 5, and 6 are side sectional views of a storage housing 40 of the developing device 38.

The developing device 38 shown in FIGS. 2 and 3 is a device that develops the latent image held by the photoreceptor 32 as described above with a developer G. The developer G is a developer that includes toner and a magnetic carrier. Specifically, as shown in FIG. 2, the developing device 38 includes a storage housing 40, a sealing member 50, a device housing 60, a developing roller 80, a storage part 63, an inner wall 68, an inlet 48, a filter 49, a partition member 70, a limiting portion 79 (see FIG. 4), and support portions 46. Each part of the developing device 38 will be described below.

Storage Housing 40

The storage housing 40 shown in FIGS. 2 and 3 is an example of a housing, and is formed in the shape of a box having a length in the front-rear direction. As shown in FIG. 2, the storage housing 40 includes an opening portion 42 that is open downward, and the developer G is stored in a storage space 44A formed inside the storage housing 40. The storage space 44A is a region, in which the developer G is present, of an internal space 44 of the storage housing 40. Specifically, the internal space 44 of the storage housing 40 includes a storage space 44A in which the developer G is stored and an inflow space 44B that communicates with the inlet 48. The inflow space 44B is disposed on the upper side of the storage space 44A. In this way, each of the storage space 44A and the inflow space 44B forms a part of the internal space 44 of the storage housing 40.

Sealing Member 50

The sealing member 50 shown in FIGS. 2 and 4 is an example of a sealing part and seals the opening portion 42. The sealing member 50 is removed to allow the developer G to fall through the opening portion 42. That is, the developer G stored in the storage space 44A falls through the opening portion 42 due to its own weight in a case where the opening portion 42 sealed by the sealing member 50 is opened.

The sealing member 50 is formed in a film shape (that is, a membrane shape). Specifically, the sealing member 50 is formed of, for example, a film made of a resin. The sealing member 50 is bonded to the storage housing 40 at the opening portion 42 by, for example, fusion bonding (so-called heat sealing).

Specifically, the sealing member 50 includes a sealing portion 52 and a pull-out portion 54 as shown in FIG. 4. The sealing portion 52 is a portion that seals the opening portion 42 from one end portion 42A (specifically, a rear end portion) of the opening portion 42 over the other end portion 42B (specifically, a front end portion) thereof. The pull-out portion 54 is a portion that is disposed beneath the sealing portion 52, is connected to the sealing portion 52 on a side of the one end portion 42A of the opening portion 42, and is to be pulled out toward the other end portion 42B from the one end portion 42A of the opening portion 42. Specifically, the pull-out portion 54 is pulled forward by a user.

The sealing portion 52 is attached to an end portion 75 of the partition member 70 in a state where the sealing portion 52 is folded upward on a side of the other end portion 42B of the opening portion 42.

The sealing part may be formed of a film made of metal, and various sealing parts can be used. Further, the sealing part may be bonded to the storage housing 40 by a bonding method using a bonding agent, such as an adhesive, or other bonding methods.

Device Housing 60, Developing Roller 80, Storage Part 63, and Inner Wall 68

The device housing 60 shown in FIGS. 2 and 3 is a component that stores the developer G having fallen from the storage space 44A through the opening portion 42 of the storage housing 40.

In a state where the developing device 38 is installed on each of the toner image forming units 20Y to 20K, an opening portion 64, which is open toward the photoreceptor 32 side (specifically, a left side), is formed in the device housing 60 as shown in FIGS. 2 and 3. The developing roller 80, which supplies the developer G to the photoreceptor 32, is provided in the device housing 60 such that a part of the developing roller 80 is exposed from the opening portion 64. A layer regulation member 84 is provided on the lower side of the developing roller 80. The photoreceptor 32 in a state where the developing device 38 is installed in each of the toner image forming units 20Y to 20K is shown in FIGS. 2 and 3.

The developing roller 80 is an example of a developing body, holds the developer G on the outer peripheral surface thereof, and transports the developer G to a facing position facing the photoreceptor 32. The thickness of a layer of the developer G (the amount of developer) transported toward the facing position is regulated by the layer regulation member 84. Then, the developer G (specifically, toner) present on the developing roller 80 is supplied to the photoreceptor 32 at the facing position, and the electrostatic latent image formed on the photoreceptor 32 is developed with the developer G (specifically, toner).

In addition, the device housing 60 includes a storage part 63 that stores the developer G having fallen through the opening portion 42 of the storage housing 40. The storage part 63 includes a supply passage 61 as an example of a first transport passage and an agitation passage 62 as an example of a second transport passage.

The supply passage 61 is disposed in the front-rear direction on the lower side and the right side of the developing roller 80. Specifically, the supply passage 61 is disposed in the front-rear direction on the diagonally lower right side of the developing roller 80. A developer G to be supplied to the developing roller 80 is stored in the supply passage 61, and the developer G is transported in a transport direction (specifically, to one side in the front-rear direction). Specifically, a transport auger 81 as a transport member is disposed in the supply passage 61, and the developer G is transported in the transport direction (specifically, to one side in the front-rear direction) in the supply passage 61 by the rotation of the transport auger 81.

The agitation passage 62 is disposed along the supply passage 61 to be adjacent to the supply passage 61. Specifically, the agitation passage 62 is disposed in the front-rear direction on the right side of the supply passage 61. A front end portion of the agitation passage 62 is connected to a front end portion of the supply passage 61 and a rear end portion of the agitation passage 62 is connected to a rear end portion of the supply passage 61, so that the agitation passage 62 forms a circulation passage together with the supply passage 61.

The developer G to be supplied to the supply passage 61 is stored in the agitation passage 62, and the developer G is transported in a direction opposite to the transport direction (specifically, to the other side in the front-rear direction). Specifically, a transport auger 82 as a transport member is disposed in the agitation passage 62, and the developer G is transported in the opposite direction (specifically, to the other side in the front-rear direction) while being agitated in the agitation passage 62 by the rotation of the transport auger 82.

The inner wall 68 is an example of a wall and is included in the device housing 60. Specifically, the inner wall 68 is disposed on the upper side of the developing roller 80 and includes a gap 69 that is formed between the developing roller 80 and the inner wall 68 and communicates with the outside of the developing device 38.

Inlet 48

As shown in FIG. 2, the inlet 48 is provided in the storage housing 40. The inlet 48 is a mouth portion that allows the developer G (specifically, toner) floating from the storage part 63 (specifically, the supply passage 61) to flow into the storage space 44A from which the developer G has fallen, and is a mouth portion different from the opening portion 42.

In the present exemplary embodiment, the inlet 48 is open above the supply passage 61. Specifically, the inlet 48 is open toward the upper side from the upper side of the supply passage 61. An opening width 48L (see FIG. 2) of the inlet 48 is larger than an opening width 69L (see FIG. 2) of the gap 69 of the inner wall 68. A passage width of a portion of which the passage width is minimum in a passage from the inlet 48 to a space directly above the partition member 70 is also larger than the opening width 69L (see FIG. 2) of the gap 69.

Partition Member 70

The partition member 70 is an example of a partition part, partitions the storage space 44A and the inlet 48 as shown in FIG. 2, and is moved to allow the storage space 44A and the inlet 48 to communicate with each other as shown in FIG. 3. Specifically, the partition member 70 partitions the inflow space 44B and the storage space 44A, and is moved downward to allow the inflow space 44B and the storage space 44A to communicate with each other.

The partition member 70 extrudes the developer G to the storage part 63 (specifically, the agitation passage 62) from the opening portion 42 after the removal of the sealing member 50 in a case where the partition member 70 is moved. Specifically, the partition member 70 is moved downward to extrude the developer G to the lower side from the opening portion 42 after the removal of the sealing member 50.

Further, the partition member 70 is moved toward the opening portion 42 as shown in FIG. 3 to seal the opening portion 42 after the removal of the sealing member 50. Specifically, the partition member 70 is moved downward to be supported by the support portions 46 to seal the opening portion 42 after the removal of the sealing member 50.

The partition member 70 is attached to an end portion 55 of the sealing member 50 as shown in FIG. 4, and is moved toward the opening portion 42 as shown in FIGS. 5 and 6 after the sealing member 50 is removed in a case where the sealing member 50 is pulled out along the opening portion 42. Specifically, in a case where the sealing member 50 is pulled out to the front side, the partition member 70 is moved downward to seal the opening portion 42 after the sealing member 50 is removed.

Limiting Portion 79

The limiting portion 79 shown in FIGS. 4, 5, and 6 is a component that is provided on the partition member 70 and limits the movement of the partition member 70, which has been moved to the opening portion 42, in a pull-out direction (see FIG. 6). Specifically, for example, the limiting portion 79 is provided on the partition member 70 and is in contact with the storage housing 40 to limit the movement of the partition member 70, which has been moved to the opening portion 42, in the pull-out direction (specifically, to the front side) (see FIG. 6).

Support Portion 46

As shown in FIG. 2, the support portions 46 have a function to support the sealing member 50 at the opening portion 42. In addition, the support portions 46 have a function to support the partition member 70, which has been moved toward the opening portion 42, at the opening portion 42 as shown in FIG. 3.

In the present exemplary embodiment, the support portions 46 are formed at an edge of the opening portion 42 of the storage housing 40 to protrude inward (specifically, toward the left side and the right side).

Filter 49

The filter 49 is an example of a collecting part, and is provided on the storage housing 40 as shown in FIG. 2. The filter 49 collects the developer G (specifically, toner) that has flowed into the inflow space 44B through the inlet 48.

Here, the developer G (specifically, toner) floating from the storage part 63 (specifically, the supply passage 61) specifically flows into the inflow space 44B through the inlet 48, and a part of the developer G is moved to the storage space 44A, from which the developer G has fallen, and is diffused in the storage space 44A. After that, a part of the developer G (specifically, toner) diffused in the storage space 44A falls on the partition member 70 sealing the opening portion 42, and the other part of the developer G is collected by the filter 49 through the inflow space 44B.

In the present exemplary embodiment, the filter 49 is disposed on a side of the partition member 70, which is not yet moved, opposite to the storage space 44A. Specifically, the filter 49 is disposed at a discharge port 47, which is formed in the storage housing 40, on the upper side of the partition member 70 that is not yet moved downward.

Supply operation for supplying developer G, which is stored in storage housing 40, to the storage part 63

A user pulls the pull-out portion 54 of the sealing member 50 from the one end portion 42A of the opening portion 42 toward the other end portion 42B (forward) (see FIGS. 4 and 5). Accordingly, the pull-out portion 54 and the sealing portion 52 of the sealing member 50 are moved toward the front side of the opening portion 42, and the sealing member 50 is removed from the opening portion 42. As a result, the opening portion 42 is opened and the developer G stored in the storage space 44A starts to fall into the agitation passage 62 through the opening portion 42.

In addition, in a case where the pull-out portion 54 of the sealing member 50 is pulled forward, the partition member 70 is moved toward the opening portion 42 (that is, downward) and extrudes the developer G, which is stored in the storage space 44A, to the agitation passage 62 from the opening portion 42. That is, the partition member 70 extrudes the developer G after the removal of the sealing member 50.

The partition member 70 moved toward the opening portion 42 is supported at the opening portion 42 by the support portions 46 and seals the opening portion 42. That is, the partition member 70 seals the opening portion 42 after the removal of the sealing member 50. In this way, the developer G stored in the storage housing 40 is supplied to the storage part 63 (specifically, the agitation passage 62). Then, the developing device 38 in which the developer G has been supplied to the storage part 63 (specifically, the agitation passage 62) is installed in each of the toner image forming units 20Y to 20K.

Action of Present Exemplary Embodiment

In the present exemplary embodiment, as described above, the filter 49 collects the developer G (specifically, toner) that has flowed into the storage space 44A through the inlet 48.

For this reason, a space is saved as compared to a case where the developer G (specifically, toner) floating from the storage part 63 is caused to flow into only a space separate from the storage space 44A formed inside the storage housing 40 and is collected. As a result, the developing device 38 and the image forming apparatus 10 are reduced in size.

Further, in the present exemplary embodiment, the partition member 70 partitions the storage space 44A and the inlet 48 as shown in FIG. 2 and is moved to allow the storage space 44A and the inlet 48 to communicate with each other as shown in FIG. 3.

For this reason, the outflow of the developer G stored in the storage space 44A through the inlet 48 is suppressed as compared to a case where the storage space 44A and the inlet 48 always communicate with each other.

Furthermore, in the present exemplary embodiment, the partition member 70 extrudes the developer G to the storage part 63 (specifically, the agitation passage 62) from the opening portion 42 after the removal of the sealing member 50 in a case where the partition member 70 is moved.

For this reason, the poor falling of the developer G is suppressed as compared to a case where the developer G stored in the storage space 44A falls from the opening portion 42 due to only its own weight.

Moreover, in the present exemplary embodiment, the filter 49 is disposed on a side of the partition member 70, which is not yet moved, opposite to the storage space 44A.

For this reason, the life of the filter 49 is lengthened as compared to a case where the filter 49 is disposed on the side of the storage space 44A of the partition member 70 that is not yet moved.

Further, in the present exemplary embodiment, the partition member 70 is moved toward the opening portion 42 as shown in FIG. 3 to seal the opening portion 42 after the removal of the sealing member 50.

For this reason, the inflow of the developer G (specifically, toner), which floats from the storage part 63 (specifically, the agitation passage 62), into the storage space 44A through the opening portion 42 is suppressed as compared to a case where the opening portion 42 is maintained open after the removal of the sealing member 50.

Furthermore, in the present exemplary embodiment, the support portions 46, which are formed at the edge of the opening portion 42 of the storage housing 40 to protrude inward (specifically, toward the left side and the right side), support the partition member 70, which has been moved toward the opening portion 42, at the opening portion 42 as shown in FIG. 3.

For this reason, the number of components is reduced as compared to a case where the partition member 70 is supported by components added to the storage housing 40.

Moreover, in the present exemplary embodiment, the partition member 70 is attached to the end portion 55 of the sealing member 50, and is moved toward the opening portion 42 after the sealing member 50 is removed in a case where the sealing member 50 is pulled out along the opening portion 42.

For this reason, the number of steps of work for pulling out the sealing member 50 and the partition member 70 is reduced as compared to a case where pulling out the partition member 70 is performed separately from pulling out the sealing member 50.

Further, in the present exemplary embodiment, the limiting portion 79 is provided on the partition member 70 and limits the movement of the partition member 70, which has been moved to the opening portion 42, in the pull-out direction.

For this reason, the poor sealing of the opening portion 42 performed by the partition member 70 is suppressed as compared to a case where the partition member 70 moved to the opening portion 42 is freely movable in the pull-out direction.

Furthermore, in the present exemplary embodiment, the sealing portion 52 is attached to the end portion 75 of the partition member 70 in a state where the sealing portion 52 is folded upward on the side of the other end portion 42B of the opening portion 42 as shown in FIG. 4.

For this reason, the peeling of the sealing member 50 from the end portion 75 of the partition member 70 is suppressed as compared to a case where the sealing member 50 is attached to the end portion 75 of the partition member 70 without being folded on the side of the other end portion 42B of the opening portion 42.

Moreover, the inlet 48 is open above the supply passage 61 as shown in FIG. 3 in the present exemplary embodiment.

For this reason, more developer G floating from the supply passage 61 is collected than the developer floating from the agitation passage 62 as compared to a case where the inlet 48 is open above the agitation passage 62.

Further, the opening width 48L (see FIG. 2) of the inlet 48 is larger than the opening width 69L (see FIG. 2) of the gap 69 of the inner wall 68 in the present exemplary embodiment.

For this reason, the discharge of the developer G (specifically, toner), which floats from the storage part 63 (specifically, the supply passage 61), to the outside of the developing device 38 through the gap 69 is suppressed as compared to a case where the opening width 48L (see FIG. 2) of the inlet 48 has a dimension equal to or smaller than the opening width 69L (see FIG. 2) of the gap 69 of the inner wall 68.

MODIFICATION EXAMPLES

The inflow space 44B (filter 49), the partition member 70, the storage space 44A, the sealing member 50, and the opening portion 42 (support portions 46) are arranged in order from an upper side toward a lower side as shown in FIG. 2 in the present exemplary embodiment, but are not limited thereto. For example, the inflow space 44B (filter 49), the partition member 70, the storage space 44A, the sealing member 50, and the opening portion 42 (support portions 46) may be adapted to be arranged from one side toward the other side in the left-right direction. In this case, the partition member 70 is moved to the opening portion 42 from one side toward the other side in the left-right direction.

Further, in the present exemplary embodiment, the partition member 70 is adapted to extrude the developer G to the storage part 63 (specifically, the agitation passage 62) from the opening portion 42 after the removal of the sealing member 50 in a case where the partition member 70 is moved. However, the partition member 70 is not limited thereto. For example, the developing device 38 may be adapted so that the developer G stored in the storage space 44A falls from the opening portion 42 due to only its own weight.

Furthermore, the filter 49 is disposed on a side of the partition member 70, which is not yet moved, opposite to the storage space 44A in the present exemplary embodiment, but is not limited thereto. For example, the filter 49 may be adapted to be disposed on the side of the storage space 44A of the partition member 70 that is not yet moved.

Moreover, the partition member 70 is moved toward the opening portion 42 to seal the opening portion 42 after the removal of the sealing member 50 as shown in FIG. 3 in the present exemplary embodiment, but is not limited thereto. For example, the developing device 38 may be adapted so that the opening portion 42 is maintained open after the removal of the sealing member 50.

Further, the support portions 46, which are formed at an edge of the opening portion 42 of the storage housing 40 to protrude inward (specifically, toward the left side and the right side), support the partition member 70, which has been moved toward the opening portion 42, at the opening portion 42 as shown in FIG. 3 in the present exemplary embodiment, but is not limited thereto. For example, the partition member 70 may be adapted to be supported by components added to the storage housing 40.

Furthermore, in the present exemplary embodiment, the partition member 70 is attached to the end portion 55 of the sealing member 50 and is moved toward the opening portion 42 after the sealing member 50 is removed in a case where the sealing member 50 is pulled out along the opening portion 42. However the partition member 70 is not limited thereto. For example, the developing device 38 may be adapted so that pulling out the partition member 70 is performed separately from pulling out the sealing member 50.

Moreover, the limiting portion 79 is provided on the partition member 70 and limits the movement of the partition member 70, which has been moved to the opening portion 42, in the pull-out direction in the present exemplary embodiment, but is not limited thereto. For example, the partition member 70 moved to the opening portion 42 may be adapted to be freely movable in the pull-out direction.

Further, in the present exemplary embodiment, the sealing portion 52 is attached to the end portion 75 of the partition member 70 in a state where the sealing portion 52 is folded upward on the side of the other end portion 42B of the opening portion 42 as shown in FIG. 4. However, the sealing portion 52 is not limited thereto. For example, the sealing member 50 may be adapted to be attached to the end portion 75 of the partition member 70 without being folded on the side of the other end portion 42B of the opening portion 42.

Furthermore, the inlet 48 is open above the supply passage 61 as shown in FIG. 3 in the present exemplary embodiment, but is not limited thereto. The inlet 48 may be adapted to open above the agitation passage 62.

Moreover, the opening width 48L (see FIG. 2) of the inlet 48 is larger than the opening width 69L (see FIG. 2) of the gap 69 of the inner wall 68 in the present exemplary embodiment, but is not limited thereto. For example, the opening width 48L (see FIG. 2) of the inlet 48 may have a dimension equal to or smaller than the opening width 69L (see FIG. 2) of the gap 69 of the inner wall 68.

The present invention is not limited to the above-mentioned exemplary embodiment and may include various modifications, alterations, or improvements without departing from the scope of the present invention. For example, a plurality of modification examples among the above-mentioned modification examples may be appropriately combined.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A developing device comprising:

a housing which includes an opening portion open downward and in which a developer is stored in an internal storage space, the internal storage space being formed of a region of the internal storage space in which the developer is present;

a sealing part that seals the opening portion and is removed to allow the developer to fall through the opening portion;

a storage part that stores the developer having fallen through the opening portion;

an inlet that is provided in the housing, allows the developer floating from the storage part to flow into the internal storage space from which the developer has fallen, and is different from the opening portion; and a collecting part that is provided on the housing and collects the developer having flowed into the internal storage space through the inlet.

2. The developing device according to claim 1, further comprising:

a partition part that partitions the internal storage space and the inlet and is moved to allow the internal storage space and the inlet to communicate with each other.

3. The developing device according to claim 2, wherein the partition part extrudes the developer to the storage part from the opening portion after the removal of the sealing part in a case where the partition part is moved.

4. The developing device according to claim 3, wherein the collecting part is disposed on a side of the partition part, which is not yet moved, opposite to the internal storage space.

5. The developing device according to claim 4, wherein the partition part is moved toward the opening portion to seal the opening portion after the removal of the sealing part.

6. The developing device according to claim 5, further comprising:

a support portion that is formed at an edge of the opening portion of the housing to protrude inward and supports the partition part, which has been moved toward the opening portion, at the opening portion.

7. The developing device according to claim 3, wherein the partition part is moved toward the opening portion to seal the opening portion after the removal of the sealing part.

8. The developing device according to claim 7, further comprising:

a support portion that is formed at an edge of the opening portion of the housing to protrude inward and supports the partition part, which has been moved toward the opening portion, at the opening portion.

9. The developing device according to claim 3, wherein the partition part is attached to an end portion of the sealing part and is moved toward the opening portion after the sealing part is removed in a case where the sealing part is pulled out along the opening portion.

10. The developing device according to claim 2, wherein the collecting part is disposed on a side of the partition part, which is not yet moved, opposite to the internal storage space.

11. The developing device according to claim 10, wherein the partition part is moved toward the opening portion to seal the opening portion after the removal of the sealing part.

12. The developing device according to claim 11, further comprising:

a support portion that is formed at an edge of the opening portion of the housing to protrude inward and supports the partition part, which has been moved toward the opening portion, at the opening portion.

13. The developing device according to claim 2, wherein the partition part is moved toward the opening portion to seal the opening portion after the removal of the sealing part.

14. The developing device according to claim 13, further comprising:

a support portion that is formed at an edge of the opening portion of the housing to protrude inward and supports the partition part, which has been moved toward the opening portion, at the opening portion.

15. The developing device according to claim 2, wherein the partition part is attached to an end portion of the sealing part and is moved toward the opening portion after the sealing part is removed in a case where the sealing part is pulled out along the opening portion.

16. The developing device according to claim 15, further comprising:

a limiting portion that is provided on the partition part and limits a movement of the partition part, which has been moved to the opening portion, in a pull-out direction.

17. The developing device according to claim 15, wherein the sealing part includes a sealing portion that seals the opening portion from one end portion of the opening portion over the other end portion of the opening portion, and a pull-out portion that is disposed beneath the sealing portion, is connected to the sealing portion on a side of the one end portion of the opening portion, and is to be pulled out toward the other end portion from the one end portion of the opening portion, and the sealing portion is attached to an end portion of the partition part in a state where the sealing portion is folded upward on a side of the other end portion of the opening portion.

18. The developing device according to claim 1, wherein the storage part includes a first transport passage in which a developer to be supplied to a developing body is stored and the developer is transported in a transport direction, and a second transport passage which is disposed along the first transport passage to be adjacent to the first transport passage and in which a developer to be supplied to the first transport passage is stored and the developer is transported in a direction opposite to the transport direction, and the inlet is open above the first transport passage.

19. The developing device according to claim 1, further comprising:

a wall that includes a gap formed between a developing body and the wall and communicates with an outside of the developing device, wherein an opening width of the inlet is larger than an opening width of the gap.

20. An image forming apparatus comprising:

a holding body that holds a latent image; and the developing device according to claim 1 that develops the latent image.

* * * * *